United States Patent [19]
Miller et al.

[11] Patent Number: 5,928,460
[45] Date of Patent: Jul. 27, 1999

[54] WATER DISPERSIBLE ADHESIVE COMPOSITIONS

[75] Inventors: Richard Anthony Miller; Scott Ellery George, both of Kingsport, Tenn.

[73] Assignee: Eastman Chemical Company, Kingsport, Tenn.

[21] Appl. No.: 09/017,004

[22] Filed: Feb. 2, 1998

Related U.S. Application Data

[62] Division of application No. 08/519,958, Aug. 28, 1995, Pat. No. 5,744,538.

[51] Int. Cl.$^6$ .............................. C09J 5/12; B31B 1/60; B32B 31/00; C08G 63/68
[52] U.S. Cl. .................. 156/332; 156/1; 156/60; 156/297; 156/327; 524/147; 524/270; 524/297; 524/539; 528/295
[58] Field of Search ............................ 156/1, 60, 297, 156/327, 332; 524/539, 270, 297, 147; 528/295

[56] References Cited

U.S. PATENT DOCUMENTS

| | | | |
|---|---|---|---|
| 2,769,804 | 11/1956 | Hanson | 260/86.7 |
| 2,971,939 | 2/1961 | Baer | 260/45.5 |
| 2,989,517 | 6/1961 | Hanson et al. | 260/93.5 |
| 3,701,760 | 10/1972 | Hagemeyer et al. | 260/82 |
| 3,734,874 | 5/1973 | Kibler et al. | 260/29.2 |
| 3,779,993 | 12/1973 | Kibler et al. | 260/75 |
| 3,850,858 | 11/1974 | Park | 260/27 |
| 3,919,176 | 11/1975 | Meyer et al. | 260/78.4 |
| 4,070,316 | 1/1978 | Combs et al. | 260/28.5 |
| 4,127,619 | 11/1978 | Godfrey | 260/889 |
| 4,146,521 | 3/1979 | Godfrey | 260/27 |
| 4,233,196 | 11/1980 | Sublett | 260/29.2 |
| 4,304,901 | 12/1981 | O'Neill et al. | 528/290 |
| 4,335,220 | 6/1982 | Coney | 523/414 |
| 4,460,728 | 7/1984 | Schmidt et al. | 524/271 |
| 4,471,086 | 9/1984 | Foster | 524/489 |
| 4,886,853 | 12/1989 | Foster et al. | 524/477 |
| 5,098,962 | 3/1992 | Bozich | 525/437 |
| 5,218,042 | 6/1993 | Kuo et al. | 524/601 |

*Primary Examiner*—Patrick D. Niland
*Attorney, Agent, or Firm*—Jonathan D. Wood; Harry J. Gwinnell

[57] ABSTRACT

Disclosed is an essentially odorless water dissipatable or dispersible adhesive composition that is useful in forming paper articles and other products that can be recycled through repulping in both neutral and alkaline media. The water dispersible adhesive composition is preferably a hot melt adhesive that is a low molecular weight, branched copolyester containing a sulfomonomer. The copolyester adhesive composition can be used neat or formulated and exhibits broad compatibility with a variety of adhesive additives, including non polar tackifiers.

4 Claims, No Drawings

WATER DISPERSIBLE ADHESIVE COMPOSITIONS

This is a divisional application of application Ser. No. 08/519,958, filed Aug. 28, 1995, now U.S. Pat. No. 5,744,538.

FIELD OF THE INVENTION

The present invention is directed to water-dispersible adhesive compositions. More particularly, the present invention is directed to an essentially odorless formulated hot melt adhesive composition that, due to its water-dispersibility, allows paper products, nonwoven assemblies, and other disposable products to be more effectively recycled. The present invention is also directed to aqueous adhesive compositions and emulsions containing polyester and hot melt compositions containing polyester, tackifier and oils which are water dispersible while maintaining excellent adhesive properties.

BACKGROUND OF THE INVENTION

Many adhesives including, hot melt adhesives are useful for bonding various substrates together such as wood, paper, plastics, nonwoven assemblies, and textiles, as well as other materials. One use for which they are well suited is the fabrication of corrugated paper board. Hot melt adhesives, useful for producing corrugated paper board, must have high bond strength under conditions of shock, stress, high humidity, and extremes of temperature encountered in transportation and storage. In addition, the melt point, wetting time, initial tack, setting time, pot life, and general handling qualities on automatic corrugated board machinery are essential considerations.

At present, it is very desirable to recycle paper, paper products, and other disposable products to conserve material resources and to avoid large additions to landfill space. It is thus a general practice in the paper industry to recover at least a portion of the used and waste corrugated material and repulp the material for use in the preparation of other materials such as cardboard. The use of polyolefin hot melt adhesives to close or seal cartons made from corrugated material has presented problems in regard to repulpability of the used boxes or cartons (see U.S. Pat. Nos. 4,070,316; 4,127,619; 4,146,521; 4,460,728; 4,471,086; and 4,886,853). In fact, all the presently available hot melt and pressure sensitive adhesives are largely water insoluble and very difficult to disperse during the repulping process. This fact makes certain paper products, in which adhesives are necessarily utilized, unattractive since failure to disperse the insoluble adhesives results in lower quality recycled paper having variable composition and non-uniformity and thus, lower product value.

One approach to avoid the presence of insoluble adhesives in the recycled paper products is to use adhesives whose density is different from the density of water and pulp in water, thus permitting gravitational separation. However, this requires separation steps which can increase the recycling costs of the paper products containing adhesives.

Presently available water soluble or dispersible "natural" adhesives such as dextrins, cellulose gums, and animal glues derived from the hides and bones of animals have lower strength, fail to adhere well to paper and wood stocks with coatings or heavy ink applications, and sometimes require special treatment and handling because of their high viscosity. Therefore, the use of these adhesives, which may be easily recyclable, is quite low due to poor adhesive characteristics. Attempts to produce synthetic water-dispersible hot melt adhesive compositions have heretofore been unsuccessful due to resulting poor adhesive properties such as thermal stability, low strength, poor viscosities and low cold flow resistance. Additionally, costs and ease in manufacturing have precluded their use (see U.S. Pat. Nos. 3,919,176 and 5,098,962).

In addition to paper and paper products there are many disposable products, such as diapers, tampons, and sanitary napkins, in which hot melts and other types of adhesives are used. The use of current hot melt adhesives in these products complicate attempts to recycle products and separate out the insoluble sticky hot melt adhesives.

Copending application Ser. No. 08/283,011 filed Jul. 29, 1994 solves these problems and discloses water-dispersible aqueous or hot melt adhesives that maintain the desirable properties of presently available hot melt adhesives.

However, the specific adhesives disclosed in this copending application Ser. No. 08/283,011 are not compatible at higher concentrations with nonpolar additives such as hydrocarbon tackifing resins and naphthenic/paraffinic oils. Additionally, it would be very desirable to produce an adhesive composition that is essentially odorless.

SUMMARY OF THE INVENTION

A water-dispersible adhesive composition according to the present invention comprises a branched water-dispersible copolyester composition made of the residues or moieties of reaction products;

(I) 1,4-cyclohexanedicarboxylic acid;

(II) about 2 to 40 mol percent, based on the total of all acid equivalence, of at least one difunctional sulfomonomer containing at least one sulfonate group bonded to an aromatic ring wherein the functional groups are carboxyl or esters thereof;

(III) at least one diol or a mixture of diols comprising:
  (A) about 0.1 to 85 mol percent, based on the total mol percent of diol moieties having the formula $H(-OCH_2CH_2-)_nOH$ wherein n is 2 to about 20 provided that the mol percent of such moieties is inversely proportional to the value of n;
  (B) about 0.1 to 15 mol percent, based on the total mol percent of diol moieties of a poly(ethylene glycol) having the formula $H(-OCH_2CH_2-)_nOH$ wherein n is 2 to about 500, provided that the mol percent of such moieties is inversely proportional to the value of n; and
  (C) 0 to about 99 mol percent of the diol component being selected from the group consisting of glycols containing two $-C(R^1)_2-OH$ groups wherein $R^1$ in the reactant is a hydrogen atom, an alkyl of 1 to 5 carbon atoms, or an aryl group of 6 to 10 carbon atoms;

(IV) 0 to about 40 mol percent of a hydroxycarboxylic acid having one $-C(R-)_2-OH$ group, wherein R in the reactant is hydrogen or an alkyl group of 1 to 6 carbon atoms; and (V) about 0.5 to 40 mol percent of a "multifunctional" or "branch-inducing" reactant containing at least three functional groups selected from hydroxyl, carboxyl, and mixtures thereof;

the copolyester containing substantially equal mol proportions of acid equivalents (100 mol percent) and diol wherein the inherent viscosity is at least 0.1 dL/g measured in a 60/40 parts by weight solution of phenol/tetrachloroethane at 25°

C. and at a concentration of about 0.25 g of copolyester in 100 ml of the solvent, the glass transition temperature $T_g$ is no greater than 20° C., and the ring and ball softening point is at least 70° C.

The present invention further comprises the copolyester above in an adhesive formulation that comprises a mixture of (a) 20 to 80 weight percent of the above copolyester, comprised of the above amounts of moieties I, II, III, IV and V;

(b) about 2 to 60 weight percent of a tackifier selected from the group consisting of terpene resins, aromatic resins, aliphatic hydrocarbon resins, rosins, and functionalized polymers;

(c) about 0 to 30 weight percent of an extending oil selected from the group consisting of paraffinic oils, naphthenic oils, liquid polyesters, liquid hydrocarbon resins, liquid rosins, low molecular weight polyethylene glycols, dibenzoates, isobutyrates, phthalate oils, animal oils, vegetable oils, and mineral oils; and (d) about 0.1 to about 2 weight percent of a stabilizer.

DETAILED DESCRIPTION OF THE INVENTION

The applicants have unexpectedly discovered an improved adhesive that not only has excellent hot melt adhesive properties and is totally dispersible but is also essentially odor free and very compatible with tackifying resins including nonpolar tackifying resins, even at higher concentrations. The present adhesive composition can be applied as a liquid dispersion (aqueous or solvent) on substrates as well as by hot melt applications.

The present adhesive composition is completely dispersible and can be removed from the fibers from paper or wood pulp used in disposable products. The hot melt adhesive according to the present invention permits recycling of disposable products at significantly reduced processing costs without affecting the physical properties of the adhesive and resulting article.

The water-dispersible polyester composition of the present invention has an inherent viscosity of at least 0.1, preferably, 0.2 dL/g, more preferably about 0.28 to 0.65 dL/g, and most preferred about 0.4 to 0.6 dL/g measured in a 60/40 parts by weight solution of phenol/tetrachloroethane at 25° C. and at a concentration of about 0.25 g of polymer in 100 ml of solvent.

In the water dispersible adhesive composition of the present invention, (I) 1,4-cyclohexanedicarboxylic acid is preferably in a concentration to equal about 100 mol percent of the acid component when in combination with a dicarboxylic acid sulfomonomer. However, component (I) can also contain up to 10 mol percent, based on a total of 100 mol percent acid, of difunctional dicarboxylic acids other than 1,4-cyclohexanedicarboxylic acid selected from the group consisting of aliphatic dicarboxylic acids, alicyclic dicarboxylic acids, aromatic dicarboxylic acids, and mixtures of two or more of these acids. Examples of preferred suitable dicarboxylic acids include succinic; glutaric; adipic; azelaic; sebacic; fumaric; maleic; itaconic; 1,3-cyclohexanedicarboxylic; 1,3-cyclohexanedicarboxylic; phthalic; terephthalic; and isophthalic. The 1,4-cyclohexanedicarboxylic acid of (I) is preferably in a concentration of about 50 to 95 mol percent based on the total acid equivalents, more preferably 60 to 90 mol percent, with a mol percent of about 70 to 90 being most preferred.

The difunctional sulfo-monomer component of (II) is preferably a dicarboxylic acid or ester thereof containing a metal sulfonate group. The cation of the sulfonate salt is preferably monovalent and can be $NH_4+$, or the metal ions $Li^+$, $Na^+$, $K^+$ and the like.

Residue or reactant (II) in the polyester of the present invention is a difunctional monomer containing a $—SO_3M$ group attached to an aromatic nucleus, wherein M is hydrogen, $NH_4$, or a metal ion. The cation of the sulfonate salt group can be $NH_4$, or the metal ions $Li^+$, $Na^+$, $K^+$ and the like.

The $—SO_3M$ group is attached to an aromatic nucleus, examples of which include benzene, naphthalene, anthracene, diphenyl, oxydiphenyl, sulfonyldiphenyl, and methylenediphenyl.

The cationic portion of a nonmetallic sulfonate group optionally present in reactant (II) is a nitrogen-based cation derived from nitrogen-containing bases which may be aliphatic, cycloaliphatic or aromatic basic compounds that have ionization constants in water at 25° C. of $10^{-3}$ to $10^{-10}$, preferably $10^{-5}$ to $10^{-8}$. Especially preferred nitrogen-containing bases are ammonia, dimethylethanolamine, diethanolamine, triethanolamine, pyridine, morpholine, and piperidine, due to availability, cost, and usefulness. Such nitrogen-containing bases and cations derived therefrom are described in U.S. Pat. No. 4,304,901, the disclosure of which is incorporated herein by reference in its entirety.

The amount of reactant (II) is present in a concentration of about 2 to 40 mol percent. The amount of reactant or moiety (II) is preferably about 4 to 25 mol percent, with a mol percent of about 6 to 20 being most preferred based on total acid equivalents. At amounts below 2 and in some cases below 4 mol percent, the polyester is less repulpable whereas at amounts above 40 and in some instances above 20 the polyester is more water sensitive.

Examples of preferred diols of (III) (A), due to availability, include diethylene glycol, triethylene glycol and mixtures thereof. The preferred concentration of (III) (A) is about 10 to 80 mol percent; however, when these are the preferred diols of (III) (A) the concentration is about 10 to 80 mol percent. At amounts outside this range of 10 to 80 the polyesters have lower softening points or higher $T_g$ than what is generally most preferred.

Examples of suitable poly(ethylene glycols) of (III) (B) include relatively high molecular weight polyethylene glycols, some of which are available commercially under the designation "Carbowax", a product of Union Carbide. Poly (ethylene glycols) having molecular weights of from about 500 to about 5000 are especially suitable. Moieties of (B), if used, are preferably in a concentration of about 1 to 5 mol percent, particularly when n is 10 to 30 due the preferably higher softening points.

The remaining portion of the glycol component (III) (C) can be in a concentration of 0 to 99 mol percent, more preferably about 10 to 60 mol percent. This glycol component can generally be selected from the group consisting of aliphatic, alicyclic, and aralkyl glycols. Examples of these glycols include ethylene glycol; propylene glycol; 1,3-propanediol; 2,4-dimethyl-2-ethyl-hexane-1,3-diol; 2,2-dimethyl-1,3-propanediol; 2-ethyl-2-butyl-1,3-propanediol; 2-ethyl-2-isobutyl-1,3-propane-diol; 1,3-butanediol; 1,4-butanediol; 1,5-pentanediol; 1,6-hexanediol; 2,2,4-trimethyl-1,6-hexanediol; 1,2-cyclohexanedimethanol; 1,3-cyclohexanedimethanol; 1,4-cyclohexanedimethanol; 2,2,4, 4-tetramethyl-1,3-cyclobutanediol; and p-xylylenediol. Copolymers may be prepared from two or more of the above glycols. Preferred glycols, due to availability, cost, and usefulness, include ethylene glycol, 1,3-propane diol, 1,4- butane diol, 1,6-hexane diol and cyclohexanedimethanols with 1,4-cyclohexanedimethanol and ethylene glycol being most preferred.

The moieties of (IV) are less preferred, due to cost and performance, but they can be present. The concentration of these moieties is preferably below 20 mol percent, more preferably below 10 mol percent, including zero.

The amount of this branching agent (V) is preferably below 20 mol percent, more preferably about 1 to 10 mol percent with a concentration of about 2 to 6 mol percent being most preferred. At very high amounts of branching agent the polyester is prone to gelation whereas at low amounts, such as below 0.5 mol percent, the polyester has poorer performance and properties.

The polyester adhesive raw material compositions (neat) preferably have a number average molecular weight of about 7,000 to 20,000 more preferably about 7,000 to 15,000. Although it is desirable to have as high a molecular weight as possible to achieve the maximum physical properties, such as tensile strength and peel strength, the melt viscosity also increase as molecular weight increases. Therefore, at very high molecular weights the melt viscosity is too high for many useful applications.

The preferred Tg of the polyester adhesive raw material composition according to the present invention is below 20° C. and more preferably varies from about −20 to 20° C., with a Tg of about −5 to 5° C. being most preferred. The Tg (glass transition temperature) of the adhesive compositions of the present invention are preferably as low as possible. Thus Tgs below 5° C. and even below 0° C. are preferred. Tgs of greater than 0° C. have generally higher ring and ball softening point (RBSP) and heat resistance but are not as flexible. A low Tg means that the adhesive compositions will not be brittle, thus, cartons adhered together with the adhesive compositions of the present invention when impacted, even at extremely cold temperatures will not shatter and thus maintain adhesion. However, extremely low Tgs are not easily obtained or at least not easily obtained without greatly affecting some other property, such as lowering the ring and ball softening point.

The polyester adhesive raw material composition according to the present invention preferably has a viscosity of about 1,500 to about 90,000 centipoise at 350° F. (177° C.), more preferably about 10,000 to 60,000 cP at 350° F. (177° C.) due to ease in application.

The ring and ball softening point (RBSP) of the polyester adhesive raw material composition of the present invention is generally at least 70° C., preferably at least 80° C., more preferably 80 to 120° C. The high temperatures of RBSP are better since this means at higher storage temperatures delamination will not occur. (High RBSP provides delamination resistance).

The polyester adhesive raw material compositions according to the present invention are particularly useful due to their good combination of properties and are suitable for use as adhesives for many substrates, particularly when blended with conventional tackifiers and additives. These substrates include non woven assemblies (such as non woven polypropylene), paper products (such as paper and paperboard), and wood pulp and are easily recyclable and repulpable. The hot melt adhesives according to the present invention are recyclable/repulpable and improved over available repulpable hot melt adhesive compositions in that the set time, temperature sensitivity, compatibility, stability on storage, shear strength, tensile strength, viscosity, and cold flow resistance are improved.

The adhesive composition according to the present invention, either neat or formulated with other components, is applied to one substrate with a second substrate being placed on top of the adhesive forming an article having the adhesive laminated between two substrates.

The adhesive composition according to the present invention can be applied in liquid form in solvent or in an aqueous solution at a concentration of about 10 to 70 weight percent, preferably 20 to 50, with the remainder being solvent or water or mixtures thereof. Surfactants and other additives can also be present to aid in the dispersibility of the adhesive composition. When applied as a solution, the adhesive compositions are generally applied by conventional processes, such as extrusion coating, spray coating, roll coating, brush coating, dip coating, etc.

The adhesive raw material composition either neat or blended with other components can also be applied as a primer in the liquid form to substrates such as paperboard to be later coated with polyolefin films. This dispersion will generally have about 20 to 60 percent solids, preferably about 40 percent solids prior to being coated onto the substrate. The extrusion of the molten polyolefin film activates the adhesive properties of the polyester composition allowing the polyolefins to be extrusion coated onto substrates at lower temperatures, thus saving energy. In this application the adhesive composition contains the copolyester component having a higher IV of at least 0.4 dl/g. At IVs below 0.4 the primed substrates when stacked tend to block and are not easily separated for later extrusion coating. This aqueous dispersion containing the copolyester adhesive composition of the present invention can contain other conventional adhesive additives such as polymer emulsions, polyethylene emulsions, and resin emulsions to alter tack and strength properties. Suitable examples of polyethylenes used in the polyethylene emulsions include low molecular weight polyethylene waxes such as, Epolene E-20 from Eastman Chemical Company.

The adhesive raw material composition can also be applied in coating formulations to a substrate such as in over print and ink formulations. Particularly useful in these applications are the higher IV copolyester compositions, even in water based formulations.

The adhesive composition according to the present invention is preferably formulated with other standard adhesive compounds and used as a hot melt adhesive. The hot melt adhesive composition is preferably applied in the melt at a temperature of about 150 to 200° C. to a surface of a substrate and, while remaining molten and pliable, applying a second surface of a substrate to the water-dispersible hot melt adhesive composition thereby forming an article of manufacture that comprises the water-dispersible hot melt adhesive composition laminated between two substrates or two surfaces of a substrate (such as a folded article that forms a container).

The adhesive compositions of the present invention are preferably not crosslinked since that would impair their water dispersibility and repulpability. However, they could be crosslinked, to a certain extent with diisocyanates to improve strength and heat resistance although this is less preferred.

The adhesive composition according to the present invention can also contain standard additives including stabilizers. Suitable stabilizers include the antioxidant type and generally consist of sterically hindered phenols, or sulfur or phosphorous substituted phenols. Representative hindered phenols include: 1,3,5-trimethyl-2,4,6-tris(3,5-di-tert-butyl- 4-hydroxy-benzyl)benzene; pentaerythritol tetrakis-3-(3,5-di-tert-butyl-4-hydroxyphenyl)propionate; n-octadecyl 3,5-di-tert-butyl-4-hydroxyphenyl) propionate; 4,4'-methylenebis (2,6-di-tert-butylphenol); 4,4'-thiobis (6-tert-butyl-o-cresol); 2,6-di-tert-butylphenol; 60(4-hydroxyphenoxy)-2,4-bis(n-octylthio)-1,3,5-triazine; di-n-octadecyl-3,5-di-tert-butyl-4-hydroxy-benzylphosphonate; 2-(n-octylthi-o)-ethyl 3,5-di-tert-butyl-4-hydroxybenzoate; and sorbitol hex[3-(3,5-di-tert-butyl-4-hydroxyphenyl) propionate]. If used, the stabilizer is present in levels of about 0.1 to 3 percent by weight preferably about 0.1 to 2 weight percent with about 0.1 to 0.5 being more preferred. An especially useful antioxidant is Irganox 1010 (from Ciba-Geigy, Hawthorne, N.Y.) which is a pentaerythritol tetrakis-3(3,5-di-tertiarybutyl-4-hydroxyphenyl)propionate.

Additional additives can be added to raise and lower Tg and RBSP. These include, for example, elastomers, extending oils, low molecular weight polyolefins, and tackifiers (e.g. tackifying resins). Although, elastomers can be added to the polyester composition, the presence of such elastomers may be adverse to certain desired properties of the composition. Therefore, it is preferable that the composition of the present invention contain substantially no elastomer. Additionally, the plasticizers such as DOP, DOTP, isobutyrates, phenols, glycols, phthalate esters and the like that can be added, can distract from the heat resistance of the final composition lowering the RBSP.

Other additives such as UV light absorbers, nucleating agents, colorants, pigments, solvents, and fillers can be present in small amounts as needed and known in the adhesive art.

Tackifiers are added to the copolyester composition to prevent cold flow and increase the softening point. Tackifiers are typically selected from at least one of the groups consisting of aliphatic hydrocarbon resins, aromatic resins, synthetic polyterpenes or terpene resins, functionalized polymers, and rosins. These tackifing resins, preferably have softening points of at least 100° C. and most preferably at least 120° C. These tackifing resins can be used alone or in combination and can be used in amounts of about 2 to 60 weight percent, preferably about 10 percent to 55 percent by weight of the adhesive composition, more preferably about 25 percent to about 50 percent by weight. In some instances in which greater thermal stability is desired, lower amounts of tackifiers are desired, such as below 40 weight percent.

Aliphatic hydrocarbon resins are disclosed in U.S. Pat. Nos. 3,850,858 and 3,701,760. These are generally low molecular weight polymerized petroleum hydrocarbons. Functionalized polymers are well known in the art and include copolymers such as styrene-co-maleic anhydride and carboxylated polyolefins such as maleated amorphous, polypropylenes. Aromatic resins are generally aromatic modified hydrocarbons, such as NEVEX 100 from Neville Chemical Company. Terpene resins are generally polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut of fraction, and various other terpenes. Commercially available tackifying resins of the terpene type include the ZONAREZ terpene B-series and 7000 series from Arizona Chemical. Also included are the rosin esters with acid numbers above 5 such as the ZONATAC resins from Arizona Chemical. Particularly useful materials are terpene mixtures containing a mixture of sulphate terpene, and at least 20 percent of at least one other terpene selected from the group consisting of pinene, limonene, or dipentene. Rosins include gum rosins, wood rosins, tall oil rosins (e.g. FORAL AX from Hercules Incorporated) and hydrogenated rosins (e.g. PERMOLYN tackifiers also from Hercules Incorporated).

Depending on the end-use application and, particularly for uses requiring pressure sensitive properties, various compatible plasticizing or extending oils can also be present in the composition to soften and plasticize the composition. Amounts of these oils are preferably about 1 to 30 percent by weight, based on the total weight of the adhesive formulation, more preferably 5 to 15 weight percent, with about 10 weight percent being most preferred. Preferred compatible oils include naphthenic oils; paraffinic oils (such as SHELL FLEX 371 from Shell Chemical Company, a naphthenic/paraffinic blend); phthalate oils such as dioctyl phthalate; liquid polyesters such as DYNACOL 720 from Huls; dibenzoates such as dipropylene glycol dibenzoate (e.g., BENZOFLEX 9-88 available commercially from Velsicol); isobutyrates (e.g., TXIB, available from Eastman Chemical Company); low molecular weight poly(ethylene glycols) and derivatives thereof such as the phenyl ether of poly(ethylene glycol) (e.g., PYCAL 95 available commercially from ICI); liquid rosin derivatives having Ring and Ball melting points below about 60° C. such as the methyl ester of hydrogenated rosin (e.g., HERCOLYN D from Hercules); liquid hydrocarbon resin such as WINGTAC from Goodyear Chemical Company; mineral oils such as the TUFFLO series from Arco Chemical; as well as vegetable and animal oils such as glyceryl esters of fatty acids and polymerization products thereof.

Other applications conventionally employing adhesives based on these polylactide polymers may require the use of wax diluents in order to reduce the melt viscosity or cohesive characteristics of the hot melt adhesive compositions without appreciably decreasing their adhesive bonding characteristics. These waxes are often used in adhesives which do not exhibit pressure sensitive properties.

Suitable waxes include 12-hydroxystearamide wax, hydrogenated castor oil, oxidized synthetic waxes, poly (ethylene oxide) having a weight average molecular weight above about 1000 and functionalized synthetic waxes such as carbonyl containing ESCOMER H101 from Exxon.

Some adhesive formulations described herein can contain both wax and extending oils components so that the presence of one or the other is not mutually exclusive.

These adhesive compositions can also be modified to increase the RBSP and reduce cold flow by including additives such as precipitated calcium carbonates and silicas such as fumed silica. A suitable fumed silica comes from Cabot Corp. as CABOSIL.

The present copolyester composition can be modified with random or alternating styrenic copolymers useful in the compositions of this invention and may be prepared by any of the several methods available for their synthesis. For example, the copolymers may be obtained by solution copolymerization directly from the respective monomers by the incremental additions of the more reactive monomer as taught by U.S. Pat. No. 2,971,939 or by a continuous recycle polymerization process described in U.S. Pat. Nos. 2,769,804 and 2,989,517. Suitable commercially available random or alternating copolymers include the DYLARK styrene/ maleic anhydride copolymers. Suitable blocked copolymers for example from Shell Chemical, include KRATON FG-1901X or KRATON FG-1921X linear styrene ethylene-1-butene styrene blocked copolymers. In formulating adhesives or sealants for use herein, the blocked copolymers should be used of 5–20 percent, preferably 7–12 percent.

The copolyester adhesive raw material composition of this invention can be prepared by adding one or more of the above modifiers to the branched copolyester, by blending with the copolyester at melt temperatures of 177–200° C. and mixing until a homogeneous mixture is obtained. A cowles stirrer provides effective mixing for these preparations.

The present water dispersible adhesive composition is an improvement over the water dispersible adhesive composition disclosed in copending application Ser. No. 08/283,011 filed Jul. 29, 1994 and publication WO 95/18191. Disclosed in that publication and patent application are water dispersible adhesive compositions that comprise a single component made of a copolyester and a blend of linear and branched copolyesters. The single component water dispersible adhesive composition as a raw material comprises a branched water dispersible polyester composition made of the moieties of reaction products that are: a difunctional dicarboxylic acid that is not a sulfomonomer; a difunctional sulfomonomer containing at least one sulfonate group bonded to an aromatic ring; at least one diol or mixture of diols of the formula H(—OCH$_2$CH$_2$—)$_n$OH with n being 2 to 20 and then an additional diol where n can be 2 to 500 in combination with 0 to 99 mol percent of a possible third diol or glycol that has two C—(R$^1$)$_2$—OH groups when R$^1$ is as defined above; an optional hydroxy carboxylic acid; and 0.1 to 40 mol percent of a multifunctional reactant containing three functional groups.

The blend in this copending application Ser. No. 08/283,011 and publication of two different polyesters comprises: 20 to 80 weight percent of a linear water-dispersible polyester. This linear polyester is made of a difunctional dicarboxylic acid that is not a sulfomonomer; at least one difunctional sulfomonomer containing one sulfonate group bonded to an aromatic ring; a diol or mixture of diols that contains 15 mol percent of the diol of formula H(—OCH$_2$CH$_2$—)$_n$OH with n being 2 to 20 and 0.1 to 50 mol percent of a polyethylene glycol with n being 2 to 500; and an optional hydroxycarboxylic acid. The branched component of the blend being 20 to 80 weight percent that is made of the moieties of a difunctional carboxylic acid that is not a sulfomonomer: a difunctional sulfomonomer containing at least one sulfonate group bonded to an aromatic ring; a difunctional reactant that is a glycol; an optional hydroxycarboxylic acid; and a multifunctional reactant containing at least three functional groups.

As with the copolyester adhesive raw material composition of the present invention the copolyester compositions disclosed in copending application Ser. No. 08/283,011 can also be blended and formulated with the other additives and used as disclosed herein. However, the present invention is significantly improved over the disclosed compositions in copending application Ser. No. 08/283,011 in that the present copolyester is essentially odorless and is much more compatible at higher concentrations with more additives such as tackifiers. The present copolyester is even very compatible with nonpolar additives. Although the copolyester adhesive raw materials disclosed in application Ser. No. 08/283,011 can be blended with tackifiers in concentrations of about 10 to 50 weight percent, the lower IV copolyesters of about 0.2 dL/g are the only ones that are completely compatible and dispersible in water at the higher concentrations of tackifier. The copolyester compositions of the present invention can be blended with nonpolar e.g. hydrocarbon tackifiers at much higher concentrations than possible with the prior compositions and are compatible even when the copolyester composition has a much higher IV such as 0.4 dL/g. When using the higher IV copolyester composition the resulting adhesive compositions are more suitable adhesives with excellent strength while still being completely dispersible in water. Please see the examples.

The following examples are intended to illustrate the present invention but are not intended to limit the reasonable scope thereof.

EXAMPLES

EXAMPLE 1

Preparation of Branched Water-Dispersible Polyester

A 1000 mL round bottom flask equipped with a ground-glass head, agitator shaft, nitrogen inlet, and a sidearm was charged with 158.2 grams (0.92 moles) of 1,4-cyclohexanedicarboxylic acid, 23.7 grams (0.08 mole) dimethyl-5-sodiosulfoisophthalate, 95.4 grams (0.90 mole) diethylene glycol, 43.2 grams (0.30 mole) 1,4-cyclohexanedimethanol, 6.70 grams (0.05 mole) trimethylol propane, and 1.17 ml of a 1.46 percent (w/v) solution of titanium isopropoxide in n-butanol. The flask was purged with nitrogen and immersed in a Belmont metal bath at 200° C. for 90 minutes and 220° C. for an additional 90 minutes under a slow nitrogen sweep with sufficient agitation. After elevating the temperature to 250° C. a vacuum of less than 0.5 mm was installed for 15 minutes to perform the polycondensation. The vacuum was then displaced with a nitrogen atmosphere and the polymer was allowed to cool after removing the flask from the metal bath. An inherent viscosity of 0.41 dL/g was determined for the recovered polymer according to ASTM D3835-79 and a glass transition temperature of 0° C. was obtained from thermal analysis by DSC. The polymer was odorless, clear, and nearly colorless.

EXAMPLE 2

Preparation of Branched Water-Dispersible Polyester

This polyester was prepared as in Example 1 except that the vacuum was for 5 minutes. The resulting polymer was also odorless, clear, and nearly colorless. The inherent viscosity was 0.2 dL/g, and the glass transition temperature was −10° C.

EXAMPLE 3

Preparation of a Water-Dispersible Hot Melt Adhesive

A branched copolyester as prepared in Example 1 was blended with tackifier and oil and stirred at about 177° C. for 2 hours to produce the adhesive composition. The composition had a Tg of about −7° C. to about 1° C. and a viscosity of 400 cP to about 20,000 centipoise at 350° F. (177° C.) as determined on a Brookfield HV: II Viscometer. The formulation was odorless at mixing temperatures of 177° C. The formulation had good adhesion to polyethylene and polypropylene films (ASTM D1876 T-Peel) and good tensile strength (ASTM 412 Test Method). The components of the adhesive and the results are reported in Table I. Into 100 ml of hot water (65–80° C.) chips. Within 15 minutes under mild agitation the adhesive was completely dispersed in the water, forming a milky mixture.

The following tables (Table I, Table II, and Table III) compare properties of the water-dispersible hot-melt adhesives according to this invention with typical hot-melt adhesive formulations in use today and one according to Ser. No. 08/283,011.

The tables and physical testing data, particularly T-peel adhesion, indicates that the polyester based adhesives demonstrate enhanced adhesion to olefin films and aluminum foil.

EXAMPLE 4

Preparation of a Water-Dispersible Hot Melt Adhesive

The copolyester of Example 2 was blended as in Example 3 with the amount of the components shown in Table I. Comparisons are in the following tables.

EXAMPLE 5 (COMPARATIVE)

Preparation of Branched Water-Dispersible Polyester

A 1000 mL round bottom flask equipped with a ground-glass head, agitator shaft, nitrogen inlet, and a sidearm was charged with 186.0 grams (0.92 moles) of dimethyl-1,4-cyclohexanedicarboxylate, 23.7 grams (0.08 mole) dimethyl-5-sodiosulfoisophthalate, 95.4 grams (0.90 mole) diethylene glycol, 43.2 grams (0.30 mole) 1,4-cyclohexanedimethanol, 6.70 grams (0.05 mole) trimethylol propane, and 1.17 ml of a 1.46 percent (w/v) solution of titanium isopropoxide in n-butanol. The flask was purged with nitrogen and immersed in a Belmont metal bath at 200° C. for 90 minutes and 220° C. for an additional 90 minutes under a slow nitrogen sweep with sufficient agitation. After elevating the temperature to 240° C. a vacuum of less than 0.5 mm was installed for 5 minutes to perform the polycondensation. The vacuum was then displaced with a nitrogen atmosphere and the polymer was allowed to cool after removing the flask from the metal bath. An inherent viscosity of 0.2 dL/g was determined for the recovered polymer according to ASTM D3835-79 and a glass transition temperature of +4° C. was obtained from thermal analysis by DSC. The polymer had an odor and was clear with a yellow color.

EXAMPLE 6 (COMPARATIVE)

Preparation of a Water-Dispersible Hot Melt Adhesive

The copolyester as prepared in Example 5 was blended as in Example 3. The components and amounts are shown in Table II. The formulation had a predominant odor at a mixing temperature of 177° C. Comparisons are in the following tables.

TABLE I

Polyester Based Adhesive Formulations
Weight Percent

| | | | |
|---|---|---|---|
| 0.2 IV Polyester Example 2 | 40 | | |
| 0.4 IV Polyester Example 1 | | 40 | |
| Pentaerythritol ester (non Polar) | 50 | 50 | tackifier |
| Dipropylene glycol dibenzoate | 10 | 10 | plasticizer |
| Antioxidant | .3 | .3 | |
| Tetra-bis-methylene-3(3,5-di-tert-butyl-4-hydroxyphenyl) propionate methane | | | |
| Brookfield Thermosel Viscosity ASTM D3236 | 177° C. 1650 190° C. 910 | 18,400 5,380 | centipoise |
| Ring and ball softening point ° C. ASTM E-28 | 71 | 97 | |
| Glass transition DSC° C. | −7 | −8 | |
| Tensile strength mpa ASTM D412 | .02 | .14 | |
| Peel Adhesion T-Peel ASTM D1876 | | | |
| Aluminum      g/mm | 3.8 | 52 | |
| polypropylene g/mm | 4.4 | 11 | |
| PET           g/mm | 10.3 | 19 | |
| Water dispersion 1 gm in 100 ml of RT water | disperse in less than 2 hours | disperse in less than 8 hours | |

TABLE II

STARTING POINT FORMULATIONS

| | Polyester Based Hot Melt | | COMMERCIAL EVA and SIS Based Hot Melt | |
|---|---|---|---|---|
| | | %/Wt. | | Wt./% |
| Polyester 0.2 IV Example 5 | | 50 | Elvax 220 | 30% — |
| Benzoflex 9-88 | | 10 | Kraton 1107 SIS | — 20% |
| Foral AX | | 39.7 | Eastotac H-100R | 45 60 |
| Irganox 1010 | | .10 | Paraflint H-1 Wax | 25 — |

TABLE II-continued

STARTING POINT FORMULATIONS

| Cyanox 1212 | .20 | Shellflex 371 | — | 20 |
|---|---|---|---|---|
|  |  | Irganox 1010 | 0.1 | 0.1 |
| Viscosity @ 177° C. ASTM D3236 | 484 cps |  | 860 cps | 2230 cps |
| RBSP ° C. ASTM E-28 | 86° C. |  | 108° C. | 87° C. |
| T-Peel Adhesion ASTM D1876 | g/mm |  | g/mm) | g/mm |
| PET | 7.3 |  | 6.5 | 2.3 |
| PE | 11.9 |  | 10.7 | 5.6 |
| PP | 14.8 |  | NA | 7.1 |
| Water Dispersion | 100% Dispersion |  | — | — |
| 1 gm in 100 ml of |  |  |  |  |
| Tap Water, pH 7.8 |  |  |  |  |
| @ RT. (24 Hours) |  |  |  |  |

ELVAX 220 - ethylene vinyl acetate polymer from DuPont
KRATON 1107 - styrene block copolymer from Shell Chemical
FORAL AX - wood rosin acid # of 140-160 from Hercules
BENZOFLEX 9-88 - dipropylene glycol dibenzoate plasticizer from Velsiol Chemical
IRGANOX 1010 - Antioxidant from Ciba Geigy
CYANOX 1212 - Antioxidant from American Cyanamid
EASTOTAC H-100R - Tackifier from Eastman Chemical Company
PARAFLINT H-1 Wax - Moore and Munger
SHELLFLEX 371 - Paraffinic/naphthenic oil from Shell Chemical

EXAMPLE 7 (COMPARATIVE)

An attempt was made to blend the polyester 0.2 IV of Example 5 with 30 weight percent of the nonpolar tackifier pentaerythritol used in Table I. The blend was incompatible and phase separated in the molten state.

EXAMPLE 8 (COMPARATIVE)

An attempt was also made to form an adhesive as above in Example 6 with the same formulation and additives shown in Table II. The copolyester being made as in Example 5 but with an IV of 0.4 dL/g (held under vacuum for a longer period of time). The blend phase separated in the molten state.

EXAMPLE 9

Aqueous Dispersion

The following results are from a 40 percent aqueous dispersion of the copolyester of Example 2 having an IV of 0.2 and another dispersion of the copolyester of Example 1 having an IV of 0.4. The dispersions were coated neat at a dry film thickness of 2 mil. T-Peel adhesion was then performed on each substrate.

TABLE III

| Test Results: | | |
|---|---|---|
|  | 0.2 IV | 0.4 IV |
| polyethylene | 9.0 g/mm | 6.3 g/mm |
| polypropylene | 93.5 g/mm | 7.3 g/mm |
| PET | 110.9 g/mm | 64.7 g/mm |

EXAMPLE 10

Diaper Construction

The above 0.4 polyester dispersion of Example 9 was coated to polyethylene film and bonded to wood pulp from a "Huggies" trade name for diaper from Kimberly Clark. The assembly was allowed to dry overnight. Five grams of this assembly was placed in 200 ml of tap water. Within two hours, the polyester adhesive dispersed.

Five grams of the above diaper assembly was placed in a 0.2 molar ionic solution (simulated body fluid). The bond assembly remained together. The adhesive did not disperse. The dispersibility in tap water and non-dispersibility in an ionic solution is a unique advantage in nonwoven articles.

*AATCC Test Method 15-1985
Alkaline solution
10 g NaCl
4 g ammonia carbonate
1 g disodium hydrogen phosphate
0.25 g histidine monohydrochloride to 1 liter

We claim:
1. A process comprising:
   applying in liquid form to a surface of a substrate a water-dispersible adhesive composition comprising:
   (a) 20 to 80 weight percent of a copolyester comprising a branched water-dispersible polyester composition made of the reaction products;
      (I) 1,4-cyclohexene dicarboxylic acid
      (II) about 2 to 40 mol percent, based on the total of all acid equivalences, of at least one difunctional sulfomonomer containing at least one sulfonate group bonded to an aromatic ring wherein the functional groups are carboxyl or esters thereof:
      (III) at least one diol or a mixture of diols comprising:
         (A) about 0.1 to 85 mol percent, based on the total mol percent of diol moieties having the formula H(—OCH$_2$CH$_2$—)$_n$OH wherein n is 2 to about 20 provided that the mol percent of such moieties is inversely proportional to the value of n;
         (B) about 0.1 to 15 mol percent, based on the total mol percent of diol moieties of a poly(ethylene glycol) having the formula H(—OCH$_2$CH$_2$—)$_n$OH wherein n is 2 to about 500, provided that the mol percent of such moieties is inversely proportional to the value of n; and
         (C) 0 to about 99 mol percent of the diol component being selected from the group consisting of glycols containing two —C(R$^1$)$_2$—OH groups wherein $R^1$ in the reactant is a hydrogen atom, an alkyl of 1 to 5 carbon atoms, or an aryl group of 6 to 10 carbon atoms;

(IV) 0 to about 40 mol percent of a hydroxycarboxylic acid having one —C(R—)$_2$—OH group, wherein R in the reactant is hydrogen or an alkyl group of 1 to 6 carbon atoms; and (V) about 0.5 to 40 mol percent of a "multifunctional" or "branch-including" reactant containing at least three functional groups selected from hydroxyl, carboxyl, and mixtures thereof;

the copolyester containing substantially equal mol proportions of acid equivalents (100 mol percent) and diol wherein the inherent viscosity is at least 0.1 dL/g measured in a 60/40 parts by weight solution of phenol/tetrachloroethane at 25° C. and at a concentration of about 0.25 g of copolyester in 100 ml of the solvent, the glass transition temperature $T_g$ is no greater than 20° C. and the ring and ball softening point is at least 70° C.;

(b) about 2 to 60 weight percent of a tackifier selected from the group consisting of terpene resins, aromatic resins, aliphatic hydrocarbon, rosins, and polymers;

(c) about 0 to 30 weight percent of an extending oil selected from the group consisting of a paraffinic oils, naphthenic oils, liquid polyesters, liquid hydrocarbon resins, liquid rosins, low molecular weight polyethylene glycols, dibenzoates, isobutyrates, phthalate oils, animal oils, vegetable oils; and mineral oils; and (d) about 0.1 to about 2 weight percent of an antioxidant stabilizer; and applying a second surface of a substrate to the water-dispersible adhesive composition thereby forming a laminate.

2. The process according to claim 1 wherein said liquid form is in the melt and the adhesive composition is a hot melt adhesive composition that is applied at a temperature of about 150 to 200° C.

3. The process according to claim 1 wherein the liquid form is in an aqueous solution at a concentration of about 10 to 70 weight percent solids.

4. The process according to claim 1 further comprising repulping the resulting laminate in an aqueous pulping solution thereby separating the water-dispersible adhesive composition from said surfaces wherein the composition of at least one substrate is a fibrous material.

* * * * *